United States Patent
Tung (10) Patent No.: US 7,693,804 B2
(45) Date of Patent: Apr. 6, 2010

(54) METHOD, SYSTEM AND COMPUTER PROGRAM PRODUCT FOR IDENTIFYING PRIMARY PRODUCT OBJECTS

(75) Inventor: Michael Tung, Stanford, CA (US)

(73) Assignee: Fatlens Inc., Mountain View, CA (US)

( * ) Notice: Subject to any disclaimer, the term of this patent is extended or adjusted under 35 U.S.C. 154(b) by 121 days.

(21) Appl. No.: 11/287,952

(22) Filed: Nov. 28, 2005

(65) Prior Publication Data

US 2007/0124110 A1 May 31, 2007

(51) Int. Cl.
*G06N 5/00* (2006.01)
(52) U.S. Cl. .......................... 706/15; 706/45
(58) Field of Classification Search .................. 706/15, 706/45; 707/5, 3
See application file for complete search history.

(56) References Cited

U.S. PATENT DOCUMENTS

| | | | | |
|---|---|---|---|---|
| 6,748,398 B2 * | 6/2004 | Zhang et al. | ............. | 707/104.1 |
| 7,269,546 B2 * | 9/2007 | Stensmo | ...................... | 704/9 |
| 2002/0103786 A1 * | 8/2002 | Goel | ............................. | 707/3 |
| 2002/0103797 A1 * | 8/2002 | Goel et al. | ..................... | 707/5 |
| 2002/0174120 A1 * | 11/2002 | Zhang et al. | ................... | 707/7 |
| 2003/0028512 A1 * | 2/2003 | Stensmo | ...................... | 707/1 |
| 2003/0088562 A1 * | 5/2003 | Dillon et al. | .................. | 707/5 |
| 2005/0210008 A1 | 9/2005 | Tran et al. | | |

* cited by examiner

*Primary Examiner*—Wilbert L Starks, Jr.
(74) *Attorney, Agent, or Firm*—William L. Botjer (57) ABSTRACT

Methods, systems and computer program products for identifying primary product objects on a web page. A primary product object is the object that shows the best view of the product the web page is detailing. A set of features is extracted for one or more objects on the web page. The primary product objects are identified by computing the probabilities of one or more objects on the web page being a primary product object, the probabilities indicating the likelihood of the one or more objects being the primary product object. The probabilities are computed by querying a statistical model.

20 Claims, 7 Drawing Sheets

METHOD, SYSTEM AND COMPUTER PROGRAM PRODUCT FOR IDENTIFYING PRIMARY PRODUCT OBJECTS

BACKGROUND

This invention relates to search algorithms on the Internet. More specifically, the invention relates to methods and systems to search for product-related information for online shopping.

The Internet has enabled online shopping. Further, it has enabled tracking down vendors of a product online. Moreover, it provides the facility of instant comparison of prices. This has made online shopping time-efficient and convenient compared to conventional shopping. Search algorithms on the Internet have enabled people to find any product from the multitude of products available.

Conventional search algorithms use keyword based searches to find web pages relating to products. These algorithms generally index web pages based on keywords and not based on product-related information. However, product-related information such as the product image, the product title and the product price determine purchase to a great extent. Further, one or more of the conventional search algorithms do not take into account the attributes of product-related information on a web page, which includes attributes of the product image, the product title and the like. As a result, the accuracy of search results is not high.

In light of the foregoing discussion, there is a need for a search algorithm that takes into account the attributes of product-related information on a web page and provides results with high accuracy. Further, since there is a lot of product-related information on web pages, there is a need for a method to extract the relevant product-related information.

SUMMARY

An object of the invention is to identify primary product objects on a web page.

Another object of the invention is to provide a search algorithm with high accuracy for finding product-related information.

Yet another object of the invention is to make online shopping more time-efficient and convenient.

In accordance with the objects of the invention, various embodiments of the invention provide a method, system and computer program product for identifying primary product objects from objects on a web page. A set of features is extracted for each of the objects on the web page. A primary product object is the object that shows the best view of the product the web page is detailing. Thereafter, the probability of each object being a primary product object is computed based on the set of features. The probabilities are computed by querying a statistical model. Primary product objects are selected based on the probabilities.

By identifying primary product objects on a webpage, online-shopping is made more convenient and time-efficient. Further, merchant web sites are benefited by higher sales as primary product objects determine purchase to a great extent. Moreover, a faster way of finding product-related information on the Internet is enabled.

BRIEF DESCRIPTION OF THE DRAWINGS

The various embodiments of the invention will hereinafter be described in conjunction with the appended drawings provided to illustrate and not to limit the invention, wherein like designations denote like elements, and in which.

DESCRIPTION OF PREFERRED EMBODIMENTS

Various embodiments of the invention provide a method, system and computer program product for identifying a primary product object from one or more objects on a web page. An object on a web page may be defined as an element of the web page, such as an image, a title, an applet and the like. The primary product object is the object that shows the best view of the product the web page is detailing. A set of features is extracted for the one or more objects on the web page. The probability of each object being the primary product object is computed based on the set of features. Thereafter, the primary product object is identified based on the probabilities.

Figure 1:
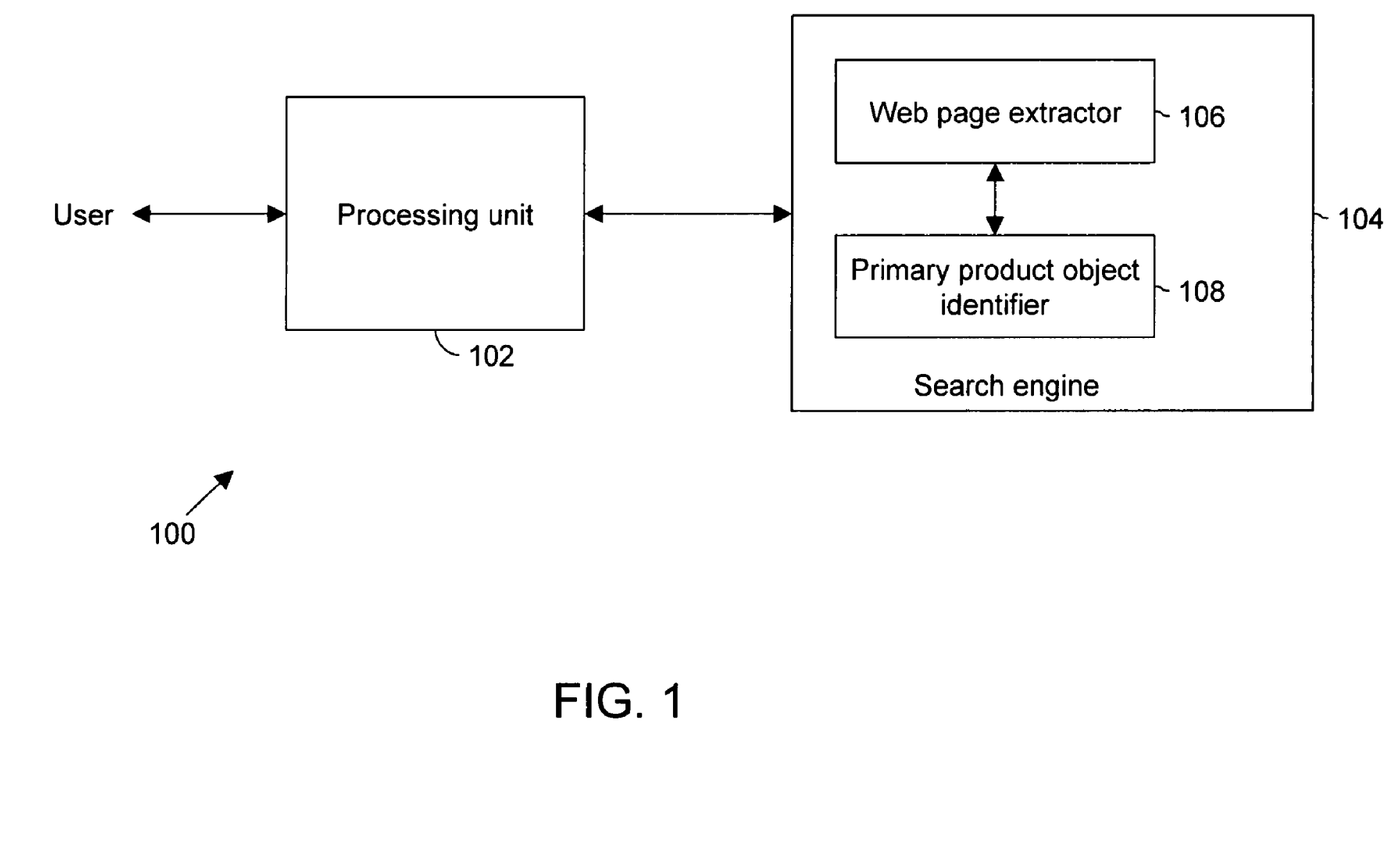
FIG. 1 is a block diagram of an environment in which various embodiments of the invention may be practiced.

FIG. 1 is a block diagram of an environment in which various embodiments of the invention may be practiced. The environment includes a network 100 which includes a processing unit 102 and a search engine 104. Search engine 104 includes a web page extractor 106 and a primary product object identifier 108. A user queries search engine 104, through processing unit 102, to obtain information related to a product. Web page extractor 106 extracts one or more relevant web pages from the Internet based on the query. Primary product object identifier 108 identifies one or more primary product objects from the one or more relevant web pages and displays them to the user. The primary product object is identified by computing the probabilities of one or more objects on the web page being primary product objects, based on a set of features of the objects.

In various embodiments of the invention, processing unit 102 may be a computer, a mobile device and the like. Examples of search engine 104 include Google®, Yahoo®, FatLens® and the like. In one embodiment of the invention, a primary product object may be an image of a product, for example, an image of a shoe, a shirt and the like. In another embodiment of the invention, the primary product object may be a product title, for example, 'a blue button-down shirt', 'a suede slip-on shoe' and the like.

Figure 2:
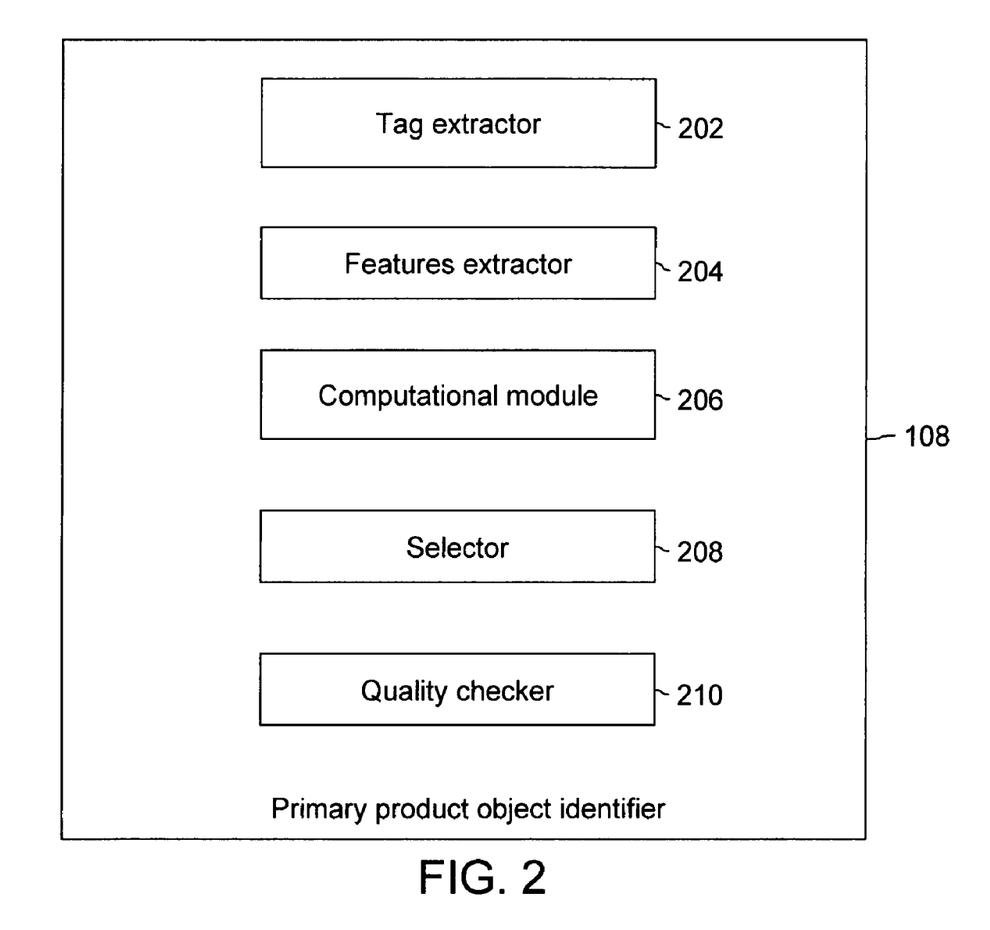
FIG. 2 is a block diagram of a primary product object identifier, in accordance with an embodiment of the invention.

FIG. 2 is a block diagram of primary product object identifier 108, in accordance with an embodiment of the invention. Primary product object identifier 108 includes a tag extractor 202, a features extractor 204, a computational module 206, a selector 208 and a quality checker 210. Tag extractor 202 extracts object tags of each object present in the one or more relevant web pages extracted by web page extractor 106. In an embodiment of the invention, HTML tags of each object on a web page are extracted. Features extractor 204 extracts a set of features of each object. Computational module 206 computes the probability of each object being the primary product object based on the set of features extracted. The probability indicates the likelihood of an object being the primary product object. Selector 208 selects one or more primary product objects from the objects based on the probabilities. Further, quality checker 210 checks the quality of the one or more primary product objects. For example, in the case of an image of the product, quality checker 210 checks the quality of the image. The functions of computational module 206, selector 208 and quality checker 210 are explained in detail in conjunction with FIG. 3, FIG. 5 and FIGS. 6a and 6b respectively.

In various embodiments of the invention, the set of features of the objects may include geometric features, stylistic features, file and hosting features, alternative text features or a combination thereof. For example, for an image of a product, the geometric features may include height, width, area, width percentage, height percentage, aspect ratio, position, ordinality of the image in source and the like. For a product title, the geometric features may include horizontal-spacing, vertical spacing and the like. Examples of stylistic features may include alignment, border, heading style, font type, font size and the like. The file and hosting features may include filetype, host of an object, type of an image, lowsrc version of the image if any, path tokens and term frequency of certain words in the filepath, and the like. Examples of the host of the object include Adhost, the host as the web page and the like. The alternative text (ALT) features may include length of the alternative text, normalized edit distance between the alternative text and page title element, alt tokens and term frequency of certain words in the alternative text, and the like.

In an embodiment of the invention, the geometric features may be estimated by performing page layout. In an embodiment of the invention, the stylistic features, file features, hosting features and alternative text features may be estimated by script interpretation such as Cascade Style Sheets (CSS) interpretation, JavaScript interpretation, inheritance and the like. In an embodiment of the invention, token features such as alternative text and path text may be derived by writing a customized product page crawler.

Figure 3:
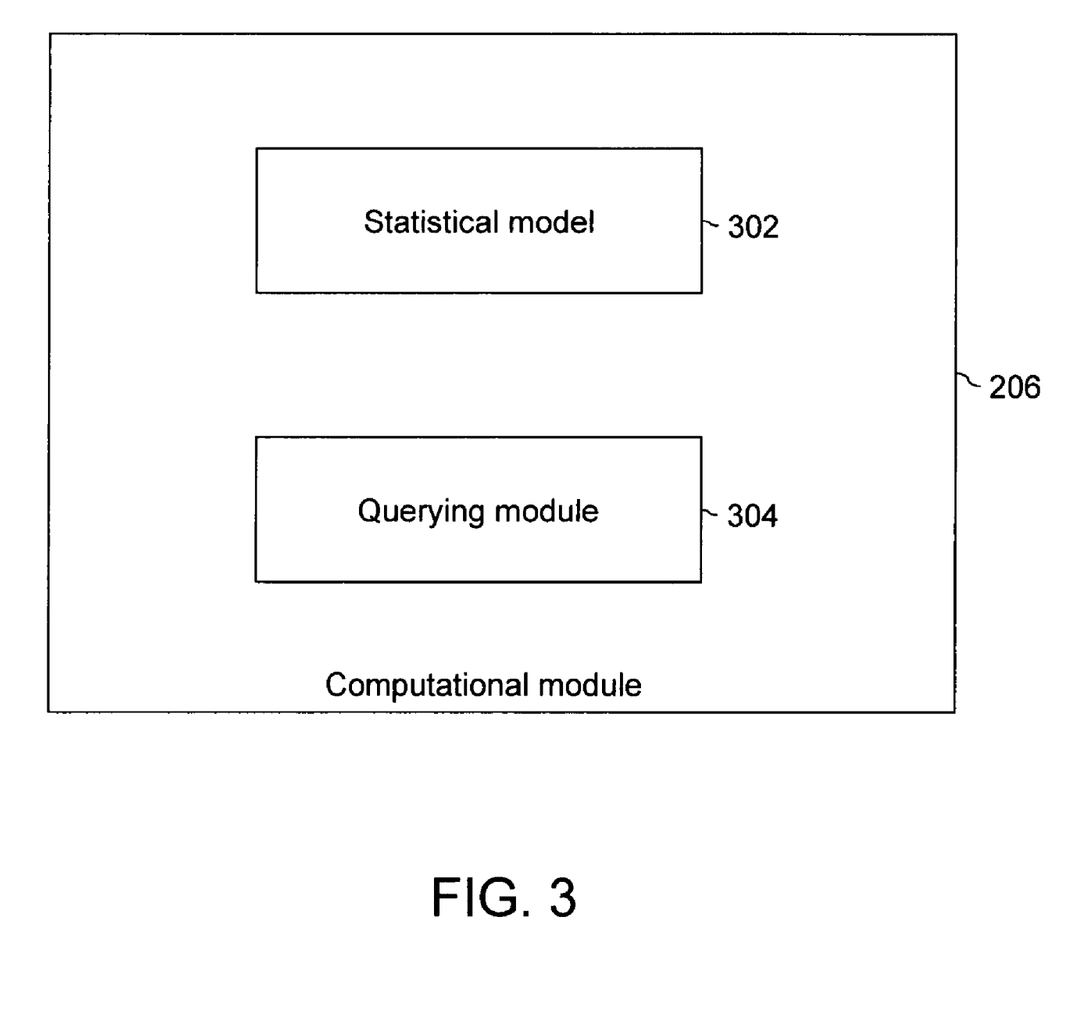
FIG. 3 is a block diagram of a computational module, in accordance with an embodiment of the invention.

FIG. 3 is a block diagram of computational module 206, in accordance with an embodiment of the invention. Computational module 206 includes a statistical model 302 and a querying module 304. Statistical model 302 computes the probability of each object being the primary product object based on the set of features extracted of the object. Querying module 304 queries statistical model 302 with the set of features. In an embodiment of the invention, statistical model 302 may be implemented as a Bayesian network. In alternate embodiments of the invention, statistical model 302 may be implemented as a Linear model, a Naïve Bayes model, a J48 Decision Tree, a k-Nearest Neighbors (KNN) model, a Support Vector Machine (SVM) and the like. In an embodiment of the invention, statistical model 302 may be generated based on one or more sets of sampled data. These one or more sets of sampled data may be built and tabulated by human training. The details of generating statistical model 302 in accordance with an embodiment of the invention are explained in conjunction with FIG. 4.

In various embodiments of the invention, system elements such as web page extractor 106, tag extractor 202, features extractor 204, computational module 206, selector 208, quality checker 210, statistical model 302 and querying module 304 may be implemented as hardware modules, software modules, firmware or a combination thereof.

Figure 4:
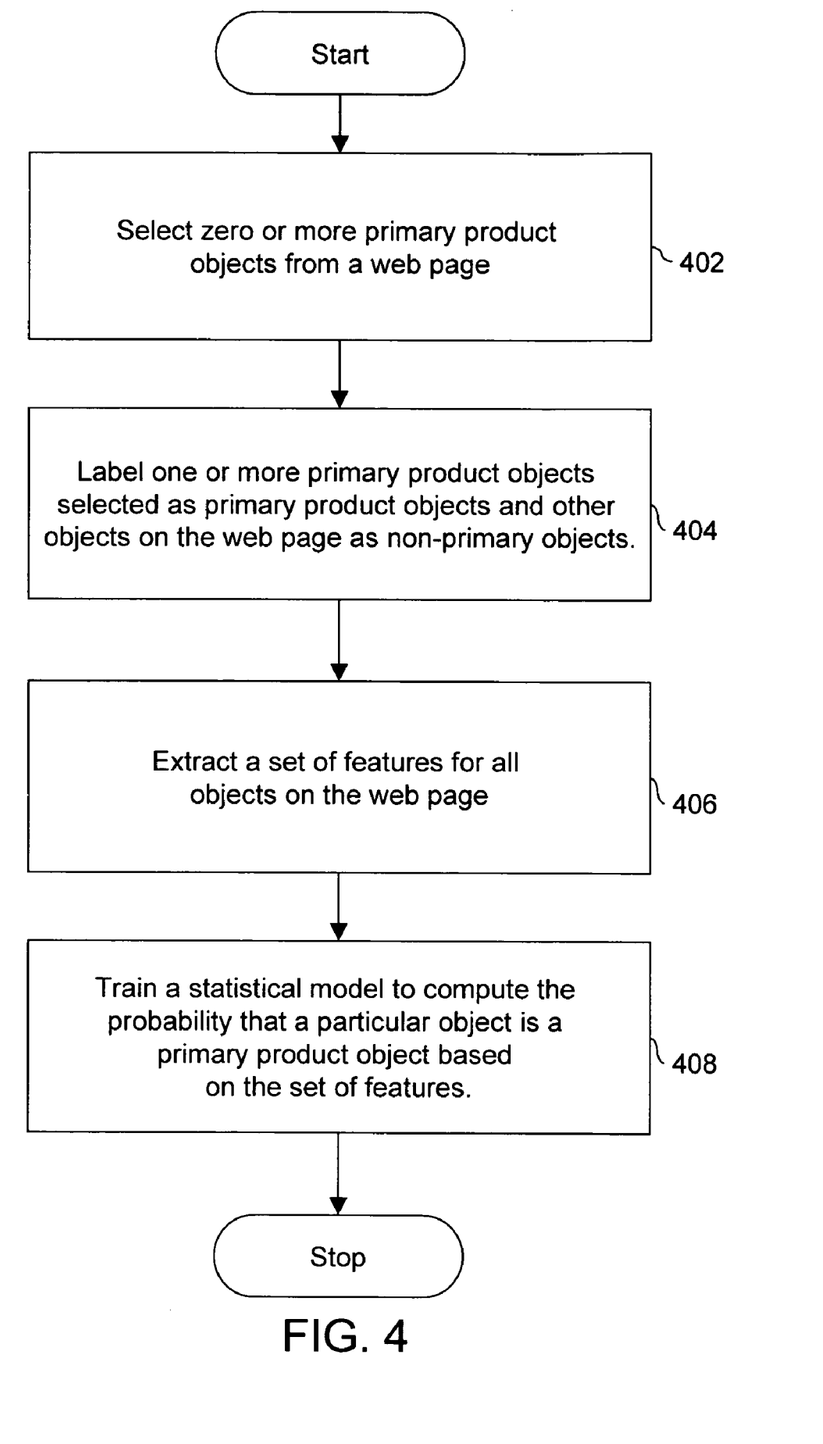
FIG. 4 is a flowchart depicting a method for generating a statistical model, in accordance with an embodiment of the invention.

FIG. 4 is a flowchart depicting a method for generating statistical model 302, in accordance with an embodiment of the invention. At step 402, a user selects zero or more primary product objects from a web page. In an embodiment of the invention, a custom browser module may be used with necessary server-side support, to present the user with the web page. In an embodiment of the invention, the custom browser module may be written in Firefox®. In one embodiment of the invention, the user may select an object as the primary product object by hovering over the object with a mouse and pressing a key.

Thereafter, at step 404, objects selected by the user are labeled as primary product objects, and all the other objects on the web page are labeled as non-product objects. If, at step 402, a user does not select any object as primary product objects, all the objects on the web page are labeled as non-product objects at step 404. Thereafter, step 406 is performed. At step 406, a set of features, for example, geometric features, stylistic features, file and hosting features, alternative text features and the like is extracted for all the objects on the web page including the non-product objects. These features are tabulated as a set of sampled data. Steps 402, 404 and 406 are performed iteratively to generate several such sets of sampled data. The sets of sampled data are then tabulated. Thereafter, at step 408, a statistical model is trained to compute the probability that an object is the primary product object, based on the set of features extracted of the object. For example, the statistical model may be trained as a Bayesian network. Structure learning on the Bayesian network may be carried out by using structure learning methods known in the art such as Hill Climbing with Random Restart, Simulated Annealing, K2 and the like. The Bayesian score criterion is used to evaluate the quality of the statistical model. Further, the statistical model is iteratively modeled and updated with respect to the Bayesian score criterion by making incremental changes to it. This confirms the statistical model to the tabulated sets of sampled data. In an embodiment of the invention, the statistical model may be updated real-time. For example, when a user purchases a product as a result of the search, a set of features may be extracted from the primary product object and these features may be tabulated along with product-related information to update the model. An exemplary statistical model trained as a Bayesian network for identifying primary product images is described below:

A total of 539 web pages were shown to a user, and the user selected the primary product images by hovering over the primary product images with a mouse and pressing a key. As a result, a total of 39,422 images were tagged. These tagged images included images that were selected as primary product images as well as images that were labeled as non-product images. A set of features was extracted for each of the 39,422 images. Thereafter, the sets of features were tabulated. The database was modeled as a Bayesian network. Structure learning on the Bayesian network was carried out using methods known in the art such as Hill Climbing with Random restart, Simulated Annealing, K2 and the like. The Bayesian score criterion was used to evaluate the quality of the model. The resulting model was updated iteratively, with an accuracy of 99.2441 percentage and a root mean square error of 0.0802 percentage. Of the total of 38,667 non-product images tagged, the model identified 38,587 correctly. Further, of the 755 primary product images selected by the user, 581 were identified by the model as primary product objects.

Figure 5:
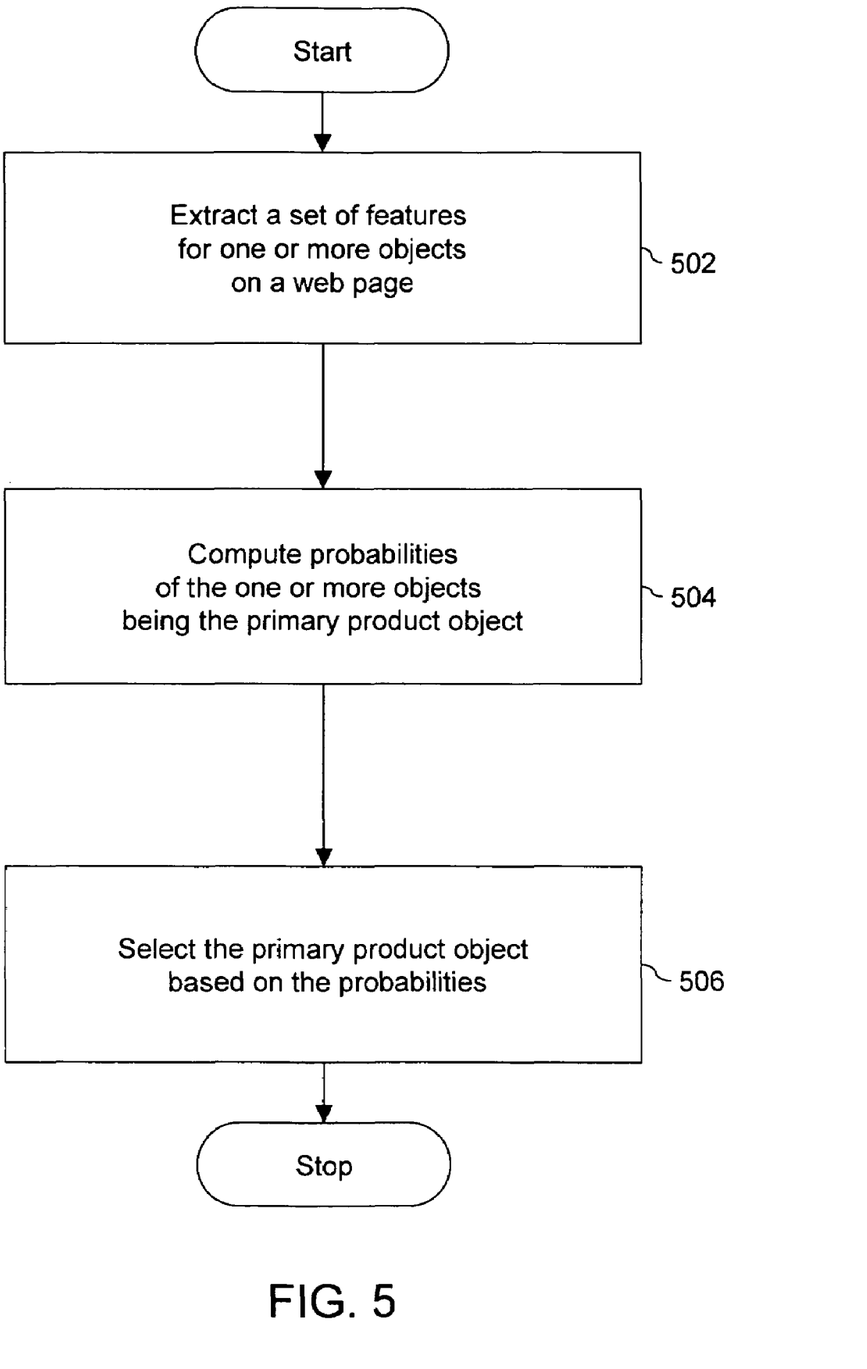
FIG. 5 is a flowchart depicting a method for identifying a primary product object on a web page, in accordance with an embodiment of the invention.

FIG. 5 is a flowchart depicting a method for identifying a primary product object on a web page, in accordance with an embodiment of the invention. At step 502, a set of features is extracted for one or more objects on the web page. At step 504, the probability of each of the one or more objects being the primary product object is computed, based on the set of features. The probability indicates the likelihood of an object being the primary product object. The probabilities are computed by querying a statistical model. Thereafter, at step 506, one or more objects are selected as the primary product object based on the probabilities of the one or more objects being the primary product object. In an embodiment of the invention, objects with probabilities that are greater than a first threshold value may be selected as primary product objects. In another embodiment of the invention, an object from the one or more objects with the highest probability may be selected as the primary product object.

Figure 6A:
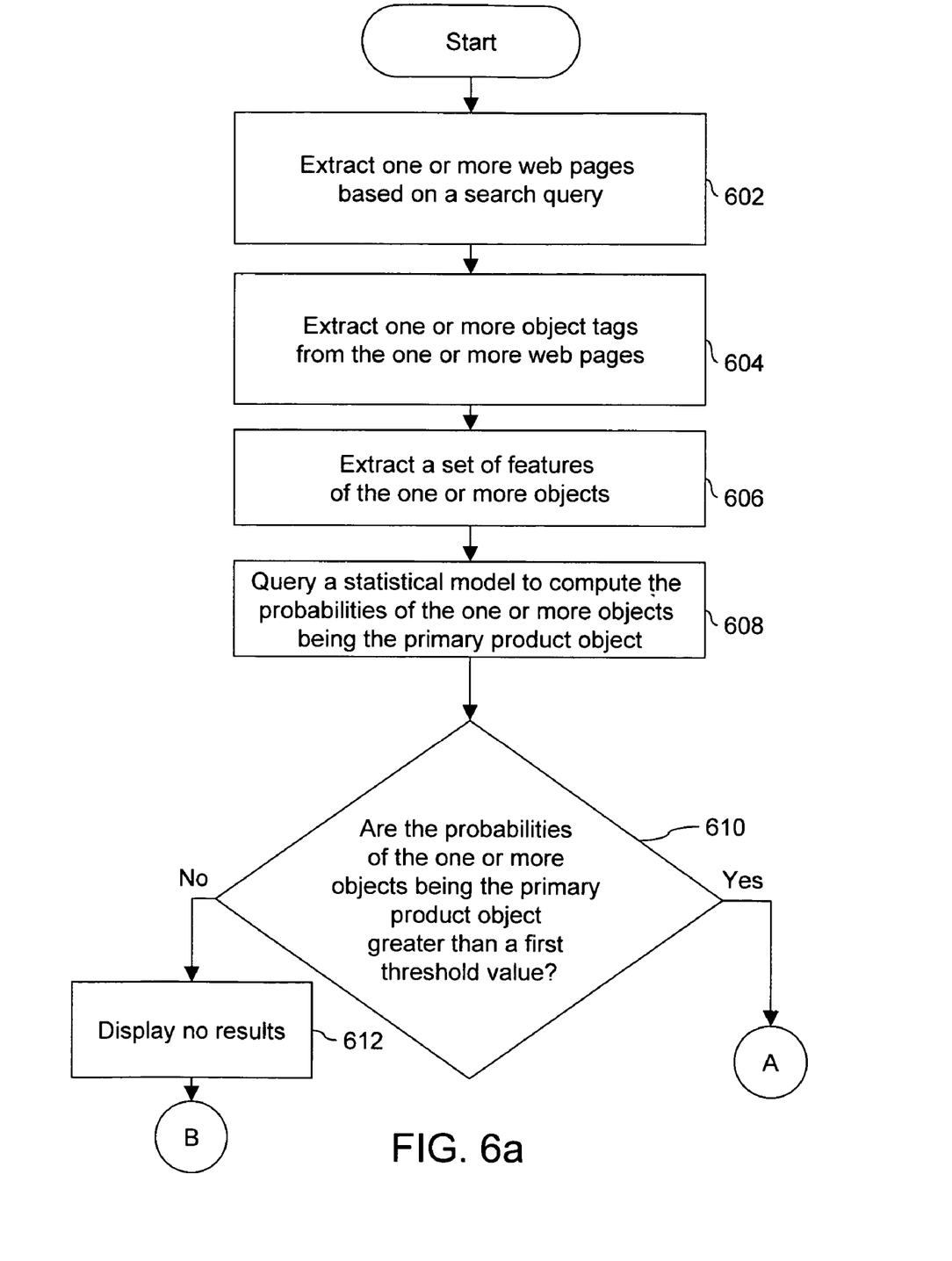
FIGS. 6a and 6b is a flowchart depicting a method for identifying a primary product object on a web page, in accordance with another embodiment of the invention.
Figure 6B:
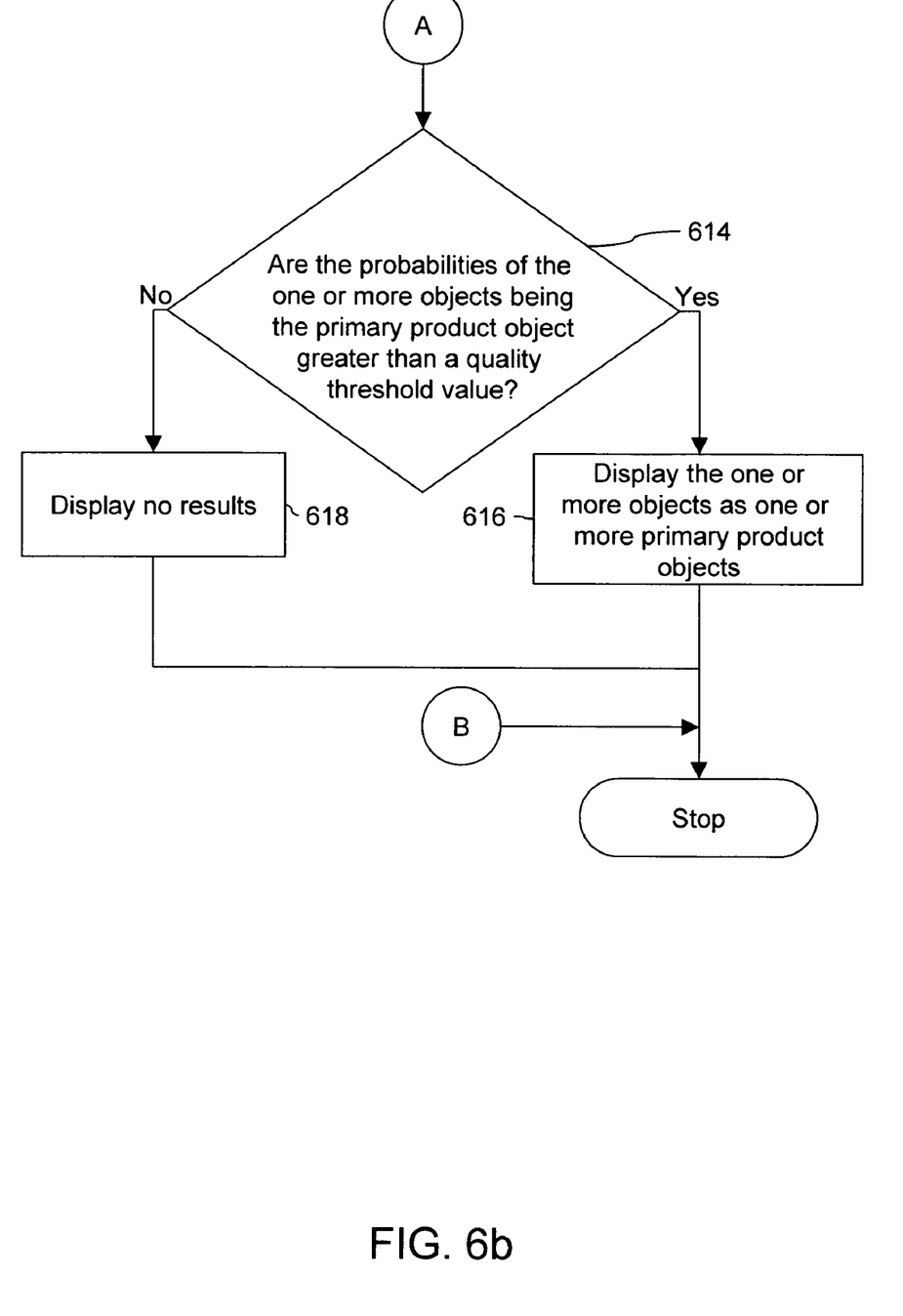

FIGS. 6a and 6b is a flowchart depicting a method for identifying a primary product object on a web page, in accordance with an embodiment of the invention. A user queries a search engine to obtain information related to a product. At step 602, one or more web pages are extracted, based on the search query. At step 604, tags corresponding to one or more objects on the one or more web pages are extracted. At step 606, a set of features of each of the one or more objects is extracted. Thereafter, at step 608, a statistical model is queried to compute the probability of each of the one of more objects being a primary product object. The probabilities are computed using a statistical model such as a Bayesian network, a Linear model, a Naive Bayes model, a J48 Decision Tree, a k-Nearest Neighbors (KNN) model, a Support Vector Machine (SVM) and the like. At step 610, the probabilities of the one or more objects being the primary product object are checked against a first threshold value. If the probabilities of the one or more objects being the primary product object are less than the first threshold value, at step 612, no results are displayed. If the probabilities of the one or more objects being the primary product object are greater than the first threshold value, step 614 is performed. At step 614, the probabilities of the one or more objects being the primary product object are checked against a "quality threshold value". If the probabilities of the one or more objects selected as the primary product object are greater than the quality threshold value, at step 616 described in detail below, the one or more objects are displayed as one or more primary product objects. If the probabilities of the one or more objects selected as the primary product object are less than the quality threshold value, at step 618, no results are displayed.

In an embodiment of the invention, the first threshold value may be selected by a system administrator, for example, the one or more objects with probabilities that are greater than 0.8 may be selected as primary product objects. In another embodiment of the invention, the one or more objects with the highest probability may be selected as the primary product object. In an embodiment of the invention, the quality threshold value may be calculated as the sum of the log probability of an object being the primary product image, and log probabilities of all other objects on the web page being non-product objects. This is illustrated by the following equation:

$$R(X_i) = \log P(X_i) + \sum_{k=1 \to n; k \neq i} \log P(X_k) \quad (1)$$

In the above equation (1), $R(X_i)$ is the quality threshold value of an $i^{th}$ object, log $P(X_i)$ is the log probability of an object being the primary product object, n is the number of objects on the web page and $$\sum_{k=1 \to n; k \neq i} \log P(X_k)$$

is the sum of the log probabilities of all the other objects on the web page being non-product objects.

The method described above is explained with the following example of an embodiment of the invention:

A user may query a search engine for blue button-down shirts. The search engine extracts relevant web pages based on the search query. These may include web pages relating to shirts, blue shirts, button down shirts and the like. Tags corresponding to all the images on the web pages are extracted. The tags may include the tags of formatting images, external advertisements and the like. A set of features such as width of the image, height of the image, width percentage, height percentage, area, horizontal-spacing, vertical-spacing, aspect ratio, host of the image, type of the image, file-path of the image, alternative text of the image, path and alt tokens of the image and the like is extracted for all the images on the web pages. Thereafter, the probability of each image being a primary product image of a category of blue button-down shirts is computed based on the set of features, by querying a statistical model. The statistical model returns the probability of each image being the primary product image of the category of blue button-down shirts. The images with the highest probability are selected as primary product images. Further, a quality check is performed for each image that is selected as the primary product image. The images are displayed if the probability of each of the images being the primary product image is greater than the sum of the log probability of each image being the primary product image and the log probabilities of all other images being non-product images. Therefore, the search algorithm identifies the images which provide the best view of blue button-down shirts and presents them to the user.

Identifying primary product objects on web pages makes online shopping a convenient and time-efficient process. Further, a faster way of finding products online is enabled. Moreover, higher sales are ensured for merchant web sites on the internet since primary product objects determine purchase to a great extent.

The primary product object identifier for identifying primary product objects on a web page, as described in the present invention or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a microprocessor. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit allows the computer to connect to other databases and the Internet through an I/O interface. The communication unit allows the transfer as well as reception of data from other databases. The communication unit may include a modem, an Ethernet card, or any similar device which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. Further, the software may be in the form of a collection of separate programs, a program module with a larger program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for identifying a primary product object on each of one or more webpages over the Internet, the method comprising the steps of:
   a. extracting each of the one or more webpages over the Internet;
   b. extracting a set of features of one or more objects on each webpage;
   c. computing a probability of each of the one or more objects on a webpage based on the set of features using statistical analysis, the probability indicating the likelihood of an object on the webpage being a primary product object;
   d. selecting an object as a primary product object from the one or more objects on the webpage if the probability exceeds a predetermined quality threshold, wherein the selected primary product object for each webpage is stored; and
   e. displaying the stored primary product objects from the one or more webpages in response to a user query to enable online searching for a product over the Internet.

2. The method of claim 1, wherein the statistical model analysis is performed using a statistical model selected from the group consisting of a Bayesian network, a Linear model, Naïve Bayes model, a J48 Decision Tree, a k-Nearest Neighbors model and a Support Vector Machine.

3. The method of claim 2 further comprising the step of building the statistical model based on sampled data.

4. The method of claim 1, wherein the set of features extracted is selected from the group consisting of geometric features, stylistic features, file features, file hosting features, and alternative text features.

5. The method according to claim 1 wherein the predetermined quality threshold is calculated as the sum of the log probability of the object being a primary product object and the log probability of other objects on the web page.

6. A method for identifying a primary product image on each of one or more webpages over the Internet, the method comprising the steps of:
   a. extracting each of the one or more webpages over the Internet;
   b. extracting a set of features of one or more images on a each webpage;
   c. computing a probability of each of the one or more images on a webpage based on the set of features using statistical analysis, the probability indicating the likelihood of an image on the webpage being a primary product image;
   d. selecting an image as a primary product image from the one or more images on the webpage if the probability exceeds a predetermined quality threshold, wherein the selected primary product image for each webpage is stored; and
   e. displaying the stored primary product images from the one or more webpages in response to a user query to enable online searching for a product over the Internet.

7. The method of claim 6, wherein the statistical analysis is performed by using a statistical model.

8. The method of claim 6, wherein the set of features extracted is selected from the group consisting of geometric features, stylistic features, file features, file hosting features, and alternative text features.

9. The method according to claim 6 wherein the predetermined quality threshold is calculated as the sum of the log probability of the image being a primary product image and the log probability of other images on the web page.

10. A primary product object identifier for identifying a primary product object on each of one or more webpages, the primary product object identifier comprising:
    a. a features extractor, the features extractor extracting a set of features of one or more objects on a web page, the webpage being one of the one or more webpages, the one or more webpages being crawled;
    b. a computational module, the computational module computing probabilities of the one or more objects on the webpage being the primary product object based on the set of features and using statistical analysis;
    c. a selector, the selector selecting an object as a primary product object from the one or more objects if the probability of an object exceeds a predetermined quality threshold, the selected primary product object for each of the one or more webpages being stored; and the stored primary product object from each of the one or more webpages is displayed in response to a user query to enable online searching for a product over the Internet.

11. The primary product object identifier of claim 10 further comprising a tag extractor, the tag extractor extracting tags of the one or more objects on the web page.

12. The primary product object identifier of claim 10 further comprising a quality checker, the quality checker checking the quality of one or more objects selected as the primary product object.

13. The primary product object identifier of claim 10 further comprising a generator, the generator generating a statistical model based on sampled data.

14. The primary product object identifier of claim 13, wherein the statistical model is selected from the group consisting of a Bayesian network, a Linear model, Naïve Bayes model, a J48 Decision Tree, a k-Nearest Neighbors model and a Support Vector Machine.

15. The primary product object identifier of claim 10, wherein the computational module further comprises a querying module, the querying module querying a statistical model to compute the probabilities.

16. The primary product object identifier of claim 10, wherein the set of features is selected from the group consisting of geometric features, stylistic features, file features, file hosting features, and alternative text features.

17. A computer program product for use with a computer, the computer program product comprising a computer usable medium having a computer readable program code embodied therein for identifying a primary product object on each of the one or more webpages over the Internet, the computer readable program code performing the steps of:

a. extracting each of the one or more webpages over the Internet;

b. extracting a set of features of one or more objects on each webpage;

c. computing a probability of each of the one or more objects on a webpage based on the set of features using statistical analysis, the probability indicating the likelihood of an object on the webpage being a primary product object;

d. selecting an object as a primary product object from the one or more objects on the webpage if the probability exceeds a predetermined quality threshold, wherein the selected primary product object for each webpage is stored; and e. displaying the stored primary product objects from the one or more webpages in response to a user query to enable online searching for a product over the Internet.

18. The computer program product of claim 17, wherein statistical analysis is performed using a statistical model.

19. The computer program product of claim 18, wherein the computer readable code further performing the step of building the statistical model based on sampled data.

20. The computer program product of claim 17, wherein the computer readable code performing computing the probability of each of the one or more objects being the primary product object further performs the step of querying a statistical model.

\* \* \* \* \*